(12) United States Patent
Palinsky et al.

(10) Patent No.: US 6,353,081 B1
(45) Date of Patent: *Mar. 5, 2002

(54) CURING AGENTS FOR EPOXY COMPOUNDS, PROCESSES FOR THEIR PRODUCTION AND THEIR USE

(75) Inventors: Andreas Palinsky, Duisburg; Manfred Doring, Dorndorf-Steudnitz; Holger Dey, Duisburg; Jorg Wuckelt, Jena, all of (DE)

(73) Assignee: Bakelite AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,380

(22) Filed: Oct. 6, 1999

(30) Foreign Application Priority Data

Oct. 10, 1998 (DE) .......................... 198 48 329

(51) Int. Cl.$^7$ ...................... C08G 59/40; C08G 65/325; C08G 65/326
(52) U.S. Cl. ...................... 528/119; 521/135; 521/178; 525/484; 528/109
(58) Field of Search ........................... 528/94, 123, 92, 528/119, 109; 521/135, 178, 92; 525/528, 484

(56) References Cited

U.S. PATENT DOCUMENTS

| 3,361,715 A | * | 1/1968 | Vogt et al. ............... 528/123 X |
| 3,677,978 A | | 7/1972 | Dowbenko et al. |
| 4,031,043 A | * | 6/1977 | Schmitter et al. ....... 521/178 X |
| 4,487,914 A | * | 12/1984 | Barton ...................... 528/94 X |
| 4,798,848 A | * | 1/1989 | Diethelm ................ 521/135 X |
| 4,826,887 A | * | 5/1989 | Kuyper et al. .......... 521/178 X |
| 5,196,261 A | * | 3/1993 | Ono et al. ............... 521/135 X |
| 5,525,698 A | * | 6/1996 | Böttcher et al. .......... 528/94 X |
| 5,569,734 A | | 10/1996 | Petschel et al. ................ 528/92 |

FOREIGN PATENT DOCUMENTS

| DE | 2152237 | 10/1972 |
| DE | 3737465 | 5/1988 |
| DE | 3737464 | 6/1988 |
| GB | 1070595 | 6/1967 |

* cited by examiner

Primary Examiner—Richard D. Lovering
(74) Attorney, Agent, or Firm—Bierman, Muserlian and Lucas

(57) ABSTRACT

Metal compounds of pseudohalogenides and their use as curing agents for epoxy compounds which curing agents can be produced by mixing the reactants in aqueous solution and are distinguished by a long processibility time at temperatures up to 100° C. as well as by very short curing times at temperatures in the range of 120 to 160° C.

4 Claims, No Drawings

CURING AGENTS FOR EPOXY COMPOUNDS, PROCESSES FOR THEIR PRODUCTION AND THEIR USE

STATE OF THE ART

Curing of epoxy resins with metal complexes is known from the literature: Examples are U.S. Pat. Nos. 3,553,166, 3,638,007, 3,792,016, 4,101,514 and DE-A 2300489 which disclose differing metal complexes which are used as curing agents for epoxy resins. They all have the disadvantage that they only develop their curing function at a speed sufficient for technical requirements above 160–220° C. At these high temperatures, cleavage products are formed which lead to poor network structures and thus cause negative polymer properties such as shrinkage, water absorption or the like.

Through the combined use of these curing agents with auxiliary bases, the cure temperatures can be slightly decreased and the acceleration effect can be controlled. Such systems, on the one hand, are cost-intensive and have the further disadvantage that the auxiliary bases react with epoxide groups leading to degradation of the polymer properties.

WO 91/13925 discloses metal complexes which can be used as latent curing agents for epoxy resins which have a significantly lower cure temperature. However, epoxy resin systems comprising these curing agents are stable in storage only up to 80° C. However, with processing techniques, such as, for example, the RIM (Reaction Injection Molding) or RTM (Resin Transfer Molding) technique, epoxy resin curing agent systems are required which are stable for several hours at temperatures up to 100° C., but which, at temperatures in the range of 120 to 160° C., cure very rapidly and as completely as possible.

OBJECTS OF THE INVENTION

It is an object of the invention to provide curing agents for epoxy compounds which can be used as the sole curing agents, which thus yield homogeneous polymer mixtures whose mixtures with epoxy resins are stable in storage for several hours up to temperatures of 100° C. and which, in the temperature range of 120 to 160° C., preferably in the temperature range of 120 to 140° C., cure rapidly and as completely as possible and which thus make possible the production of formed parts in fixed-cycle operation and of good quality by means of RIM, RTM and comparable processing techniques.

These and other objects and advantages of the invention will become obvious from the following detailed description.

THE INVENTION

The curing agents of the invention are comprised of a compound selected from the group consisting of $$M(X)_n \text{ and } M(X)_n(L)_o$$

wherein M is a bivalent or trivalent cation of a complexing metal, X is a pseudohalogen anion, L is a nitrogen-containing ligand, n is 2 or 3 and o is 1 or 2.

The curing agents of the invention are useful in curing mixtures containing epoxy resin molding materials for use in RIM and RTM techniques and comparable molding and shaping processes. They are also useful as curing agents for adhesive compositions containing epoxy resins and prepregs. When used with acid anhydrides, the curing agents may be used in the production of epoxy resin foams.

CH-A 484 867, CH-A 496 749 and EP-A 0 682 053 teach the use of pseudohalogen metal compounds or complexes of pseudohalogenide metal compounds with nitrogen bases in systems comprising epoxy resins. However, the compounds in these systems do not function as curing agents, but only as accelerators for the curing agents proper. Through side reactions of the accelerators during the curing, non-homogeneous polymer mixtures are formed in such systems.

It has been found that mixtures of epoxy resins and compounds of the formula:

$$M(X)_n \text{ or } M(X)_n(L)_o$$

wherein M is a bi- or trivalent cation of a complexing metal, X is a pseudohalogen anion, L is a nitrogen-containing ligand, n is 2 or 3, and o is 1 or 2 are processible up to several hours in the temperature range up to 100° C. and cure rapidly and as completely as possible in the temperature range from 120 to 160° C., so that postcuring of shaped parts produced and cured accordingly becomes substantially superfluous. Consequently, these compounds can be used as sole epoxy resin curing agents which, additionally, surprisingly correspond in their curing properties to the property profile required for some applications.

It has, furthermore, been found that epoxy resins cured with compounds of the formula $$M(X)_n \text{ or } M(X)_n(L)_o$$

wherein M, X, L, n and o have the above indicated definitions, exhibit improved behavior in fire. To exhibit defined responses indicating flame retardance, corresponding mixtures require approximately 30% less of additional flame-resistant agents than is necessary with epoxy resin mixtures cured by the prior art.

It was, moreover, found that mixtures comprising epoxy resins and compounds of the formulae $$M(X)_n \text{ or } M(X)_n(L)_o$$

wherein M, X, L, n and o have the above indicated definitions, form highly homogeneous foams if they are subjected, together with acid anhydrides as additional curing agents, to the anhydride curing process known per se.

The curing agents of the invention are compounds of complexing, bi- or trivalent metal ions with pseudohalogenides as well as complexes of such compounds with nitrogen-containing ligands in very low coordination number. Metal ions for these compounds are ions of bi- or trivalent principal group metals such as Mg, Ca or Al ions, as well as bi- or trivalent ions of transition group metals, particularly Mn, Fe, Co, Ni, Cu or Zn ions.

Pseudohalogenides are ions which comprise at least two electronegative elements. Examples thereof are cyanate, cyanide, thiocyanate, selenocyanate, azide or cyanamide ions. Preferred pseudohalogenides are cyanates and thiocyanates.

The nitrogen-containing ligands are mono- or polydentate nitrogen donors which can occupy at least one coordination site on the metal atom. Examples of these ligands are imidazoles, primary, secondary and tertiary aliphatic, cycloaliphatic or aromatic amines, pyrazoles, quinolines or pyridines. Preferred nitrogen-containing ligands are N-alkylimidazoles, tertiary amines and pyridines.

The production of the compounds of formula $M(X)_n$ takes place in a manner known per se by stoichiometric conversion of the alkali or ammonium salts of the pseudohalogenides with salts of the corresponding complexing metals in aqueous solution. The anions of these salts can be selected in any desired way as long as the salts are water-soluble. Preferred are cost-effective salts such as halides, sulfates, nitrates, perchlorates or acetates.

For the production of the complexes of formula $M(X)_n(L)_o$, the prior art taught to dissolve metal salts, salts of the pseudohalogenides and nitrogen-containing ligands in a polar organic solvent, preferably ethanol, and to mix these solutions in stoichiometric proportions of the reactants. To accelerate the crystallization of the complexes, a further, less polar solvent was added to the reaction mixture (J. Inorg. Nucl. Chem. 39 (1977), 216–217).

In contrast, it was found that the complexes $M(X)_n(L)_o$ can be produced in a simple manner wherein the water-soluble metal salts, alkali or ammonium salts of the pseudohalogenides and ligands in aqueous solutions are mixed in approximately stoichiometric proportions of the reactants. Only in the case of ligands which are sparingly soluble in water is it recommended to add to these solutions additionally an organic solvent functioning as a solubilizing agent. Solvents such as ethanol, propanol, dimethylformamide or dimethylsulfoxide can be used in quantities of 0.1 to 25 percent by weight relative to the total reaction mixture. After a short reaction time, the complexes produced according to the invention precipitate in high yields either as solid substances in the form of fine-particle crystals or they separate out at high temperatures as liquid products and can be separated, purified and dried in a manner known per se. As a function of the selected isolation method (separation as liquid phase or as finely dispersed powder), the conversion temperature is selected in the range from 20 to 100° C.

Surprisingly, the complexes are precipitated in pure form without the use of an auxiliary base, i.e. neither in the form of mixed complexes with various anions, nor do they contain water of crystallization or adhering organic solvents. It is a further advantage of the process of the invention of the complexes that for their production, the reactants do not need to be mixed in precise stoichiometric proportions but that deviations therefrom of up to 10% are possible without mixed complexes being formed. This is of significance for industrial production insofar as the content of water of crystallization in salts of industrial quality varies occasionally and the synthesis of the complexes of the invention tolerates such fluctuations.

This production process can be carried out continuously as well as also discontinuously due to the simple synthesis path. It yields in any event reproducible homogeneous complex compounds of the pseudohalogenides with low coordination number.

The curing agents of the invention can be readily proportioned and can be dissolved in epoxy resins at temperatures in the range of 20 to 100° C., or, they can, for example, be formed into a homogeneous mixture after melting with epoxy resins. The quantities of the curing agents used lie in the range from 0.5 to 25 percent by weight, relative to the epoxy compounds used. The solutions or mixtures of epoxy resin and curing agents of the invention are processible at temperatures up to 100° C. for up to several hours and cure completely within a few minutes at temperatures in the range of 120 to 160° C., preferably in the range of 120 to 140° C. No undesirable side reactions occur and no side or decomposition products are split off.

With the curing agents of the invention, all epoxy compounds with more than one epoxide group can be cured. Preferred epoxy compounds are polyphenol glycidyl ethers, for example those based on bisphenol A or bisphenol F or epoxidized novolaks, as well as glycidyl ethers of 4,4'-diaminodiphenylmethane and glycidylated anilines. The epoxy compounds can be mixed, in a manner known per se, with conventional fillers and additives as well as with other reactive or nonreactive oligomers or polymers, in particular with novolaks, to form corresponding compounds.

Due to the favorable reaction behavior, the long processibility time at temperatures of up to 100° C., i.e. at temperatures at which common epoxy resins have low viscosity and thus good wetting properties, and the rapid curing at only a relatively slight increase of the temperatures, corresponding mixtures are suitable especially for injection processes such as reaction injection molding (RIM) or resin transfer molding (RTM) processes and comparable shaping and molding processes.

The curing agents of the invention are therefore used as curing agents for epoxy resins and mixtures comprising epoxy resins, particularly also for mixtures comprising epoxy resins and novolaks. They are preferably used as curing agents for mixtures comprising epoxy resins for RIM, RTM or comparable shaping and molding processes as well as curing agents of adhesive compositions comprising epoxy resins and prepregs. Furthermore, the curing agents of the invention are used in combination with acid anhydrides known per se for the curing of epoxy compounds in the production of high-quality epoxy resin foams.

In the following examples, there are described several preferred embodiments to illustrate the invention. However, it should be understood that the invention is not intended to be limited to the specific embodiments.

EXAMPLE 1

29 g of cobalt(II) nitrate hexahydrate were dissolved with 16.3 g of potassium cyanate in 200 ml of water and, while stirring the solution, 16.4 g of 1-methylimidazole were added. After continuing to stir the mixture for 20 minutes at ambient temperature, the complex compound, bis(1-methylimidazole) cobalt(II) cyanate [$Co(1-MeIm)_2(NCO)_2$], was filtered, washed with water and dried to obtain a yield of 99.2% of the desired product.

Elementary Analyses
Calculated:
% Co: 19.22; % C: 39.09; % H: 3.91; % N: 27.36
Found:
% Co: 19.22; % C: 39.11; % H: 3.93; % N: 27.35;

EXAMPLE 2

19 g of copper(II) chloride trihydrate were dissolved with 13 g of potassium cyanide in 250 ml of water with stirring and then 10 g of N,N'-dimethyl-1,3-propanediamine were added. After stirring the mixture for 15 minutes at ambient temperature, the solid complex compound, (N,N'dimethyl-1,3-propanediamine)-copper(II) cyanide, precipitated at a 99% yield. The complex was filtered, washed with cold water and dried.

Elementary Analyses
Calculated:
% Cu: 29.47; % C: 38.98; % H: 5.57; % N: 25.98
Found:
% Cu: 29.45; % C: 38.94; % H: 5.57; % N: 26.01;

EXAMPLE 3

14.5 g of zinc(II) sulfate heptahydrate were dissolved in 200 ml of water with 14.5 g of potassium selenocyanate. While stirring the solution, 12.5 g of 1-butylimidazole were added and over a period of 20 minutes, the complex compound, bis(1-butylimidazole)-zinc(II) selenocyanate [$Zn(1-BuIM_2)(NCS)_2$], separated as an oil. After decanting the aqueous phase, the compound was obtained in a yield of 98.6%.

Elementary Analyses
 Calculated:
 % Zn: 12.50; % C: 36.68; % H: 4.58; % N: 16.05
 Found:
 % Zn: 12.48; % C: 36.65; % H: 4.60; % N: 16.08;

EXAMPLE 4

29 g of nickel(II) nitrate hexahydrate were dissolved in 250 ml of water together with 15 g of ammonium thiocyanate and, while stirring the solution, 23.5 g of tetramethylethylene diamine were added. After stirring for 30 minutes at ambient temperature, the green solid was filtered, washed with water and dried to obtain a 99.0% yield of bis (tetramethylethylene diamine)nickel(II) thiocyanate [Ni(TMED)$_2$(NCS)$_2$].
Elementary Analyses
 Calculated:
 % Ni: 14.43; % C: 41.31; % H: 7.87; % N: 20.65
 Found:
 % Ni: 14.47; % C: 41.32; % H: 7.87; % N: 20.62;

EXAMPLE 5

22 g of zinc(II) acetate dihydrate were dissolved in 350 ml of water with 13 g of sodium thiocyanate. While stirring, 19 g of picoline were added and, after stirring for 15 minutes, the complex compound, bis(2-picoline)zinc(II) thiocyanate [Zn(2-pic)$_2$(NCS)$_2$], had precipitated as a white solid. After filtration, washing with water and drying, a yield of 99.1% was obtained.
Elementary Analyses
 Calculated:
 % Zn: 17.80; % C: 45.73; % H: 3.81; % N: 15.24
 Found:
 % Ni: 17.81; % C: 45.77; % H: 3.78; % N: 15.19;

EXAMPLE 6

In 100 g of bisphenol-A-diglycidyl ether were dissolved at 50° C., 5 g of Co(1-MeIm)$_2$(NCO)$_2$ from Example 1. The solution remained stable at 100° C. for more than 2 hours without gelling. If the solution was heated for 30 minutes at 100° C. and then the temperature was increased to 140° C., the epoxy resin was completely cured within 4 minutes without gas development.

EXAMPLE 7

In 100 g of bisphenol-A-diglycidyl ether, 10 g of Zn(2-pic)$_2$(NCS)$_2$ from Example 5 were dissolved at 100° C. The solution was stable at 100° C. for more than 8 hours without gelling. When the solution was maintained for one hour at 100° C. and then the temperature was increased to 150° C., the epoxy resin was completely cured within 7 minutes without gas development.

EXAMPLE 8

In 100 g of bisphenol-A-diglycidyl ether, 7.5 g of Ni(TMED)$_2$(NCS)$_2$ from Example 4 were dissolved at 100° C. The solution was stable at 100° C. for more than 7 hours without gelling. When the solution was maintained for one hour at 100° C. and then the temperature was increased to 160° C., the epoxy resin was cured completely within 9 minutes without gas development.

Various modifications of the curing agent of the invention may be made without departing from the spirit or scope thereof and it is to be understood that the invention is intended to be limited only as defined in the appended claims.

What we claim is:

1. A composition comprising an epoxy resin mixture containing 0.5% to 25% by weight of a curing agent for epoxy resin mixtures consisting essentially of a compound of the formula $$M(X)_n$$

wherein M is a bivalent or trivalent cation of a complexing metal, X is a pseudohalogen anion, and n is 2 or 3.

2. A curing agent of claim 1 wherein X is a cyanate or thiocyanate anion.

3. The composition of claim 1 also containing at least one novolak.

4. The composition of claim 1 which is an adhesive composition.

* * * * *